(12) United States Patent
Yeh

(10) Patent No.: US 11,801,927 B2
(45) Date of Patent: *Oct. 31, 2023

(54) PADDLE

(71) Applicant: Tzong In Yeh, Dana Point, CA (US)

(72) Inventor: Tzong In Yeh, Dana Point, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/839,112

(22) Filed: Jun. 13, 2022

(65) Prior Publication Data

US 2023/0138893 A1    May 4, 2023

Related U.S. Application Data

(63) Continuation of application No. 16/986,648, filed on Aug. 6, 2020, now Pat. No. 11,370,515.

(30) Foreign Application Priority Data

Apr. 16, 2020 (TW) ................................ 109112886

(51) Int. Cl.
*B63H 16/04* (2006.01)
*F16B 7/14* (2006.01)

(52) U.S. Cl.
CPC ........... *B63H 16/04* (2013.01); *F16B 7/1454* (2013.01)

(58) Field of Classification Search
CPC .............................. B63H 16/04; F16B 7/1454
See application file for complete search history.

(56) References Cited

U.S. PATENT DOCUMENTS

| 3,090,976 A | * | 5/1963 | Liu | ........................ B63B 22/18 441/32 |
| 3,336,799 A | * | 8/1967 | Kermode | ............. G01C 13/002 73/170.01 |
| 3,381,529 A | * | 5/1968 | Martin | ...................... G01P 5/04 73/170.15 |
| 3,771,481 A | * | 11/1973 | Goren | ................. B63B 35/4413 114/265 |
| 4,155,673 A | * | 5/1979 | Yashima | ................. B63B 21/50 114/256 |
| 5,297,632 A | * | 3/1994 | Blandford | ............. B63B 21/502 166/344 |
| 6,022,255 A | | 2/2000 | Lukanovich | |
| 8,162,709 B2 | | 4/2012 | Boyer et al. | |
| 8,167,669 B1 | | 5/2012 | Xie et al. | |

(Continued)

FOREIGN PATENT DOCUMENTS

CN         205186496 U    4/2016
CN         205256642 U    5/2016
(Continued)

*Primary Examiner* — S. Joseph Morano
*Assistant Examiner* — Jovon E Hayes
(74) *Attorney, Agent, or Firm* — Muncy, Geissler, Olds & Lowe, P.C.

(57) ABSTRACT

The present invention disclosed a paddle, which includes a blade and a hollow lower shaft that connects to the blade. The hollow lower shaft is capable of receiving a rod and an upper shaft capable of entering and moving within said lower shaft; with one end of the upper shaft connected to the rod and able to move simultaneously with the upper shaft within the lower shaft. Wherein, the material of the rod within the hollow lower shaft is different from that of the hollow lower shaft, and the paddle is less likely to break instantaneously.

19 Claims, 7 Drawing Sheets

(56) References Cited

U.S. PATENT DOCUMENTS

| | | |
|---|---|---|
| 9,327,814 B2 | 5/2016 | Packer |
| 2006/0062676 A1* | 3/2006 | Jakubowski ............ B63B 35/44 |
| | | 416/244 R |
| 2011/0107953 A1* | 5/2011 | Jahnig ..................... F03D 13/25 |
| | | 114/264 |
| 2012/0028519 A1 | 2/2012 | Rechner et al. |
| 2013/0101418 A1 | 4/2013 | McClain |
| 2014/0152017 A1* | 6/2014 | Bhusri ................... F03D 13/25 |
| | | 290/55 |
| 2014/0248075 A1 | 9/2014 | Lee |
| 2017/0055508 A1 | 3/2017 | Shiflett, Jr. |
| 2021/0039756 A1* | 2/2021 | Peppas ................... G01S 15/88 |
| 2021/0098143 A1* | 4/2021 | Trojer ...................... G21C 5/10 |

FOREIGN PATENT DOCUMENTS

| | | | |
|---|---|---|---|
| CN | 205891199 U | 1/2017 | |
| CN | 206125387 U | 4/2017 | |
| CN | 209757491 U | 12/2019 | |
| JP | 2002258943 A * | 9/2002 | ............ B63B 1/107 |
| WO | WO-2019171089 A1 * | 9/2019 | ............ B63B 1/107 |

* cited by examiner

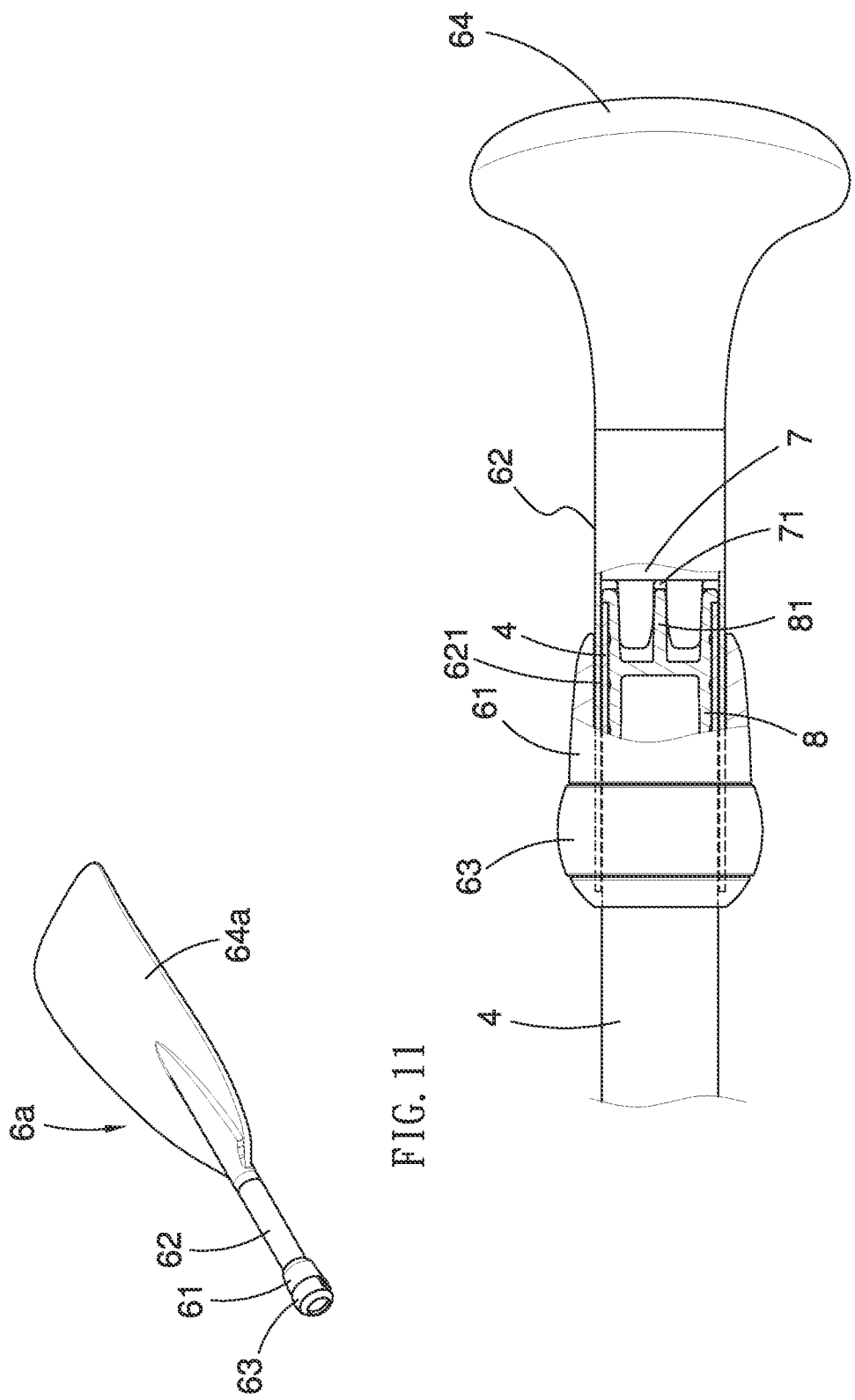

PADDLE

CROSS REFERENCE TO RELATED APPLICATIONS

This application is a Continuation of co-pending application Ser. No. 16/986,648, filed on 6 Aug. 2020, for which priority is claimed under 35 U.S.C. § 120; and this application claims priority of Application No. 109112886 filed in Taiwan on 04-16-2020 under 35 U.S.C. § 119; the entire contents of all of which are hereby incorporated by reference.

BACKGROUND OF THE INVENTION

1. Field of the Invention

The present invention relates to a paddle, and more particularly to the paddles that have extendable structure.

2. Description of the Related Art

While water sports are prevalent currently, paddles that are associated with paddleboards, canoes, rubber rafts, or other manpower boats are already quite common. As of now, many types of pre-existing paddles are adjustable in lengths, such as CN205186496U, CN205256642U, CN205891199U and other patents. This type of adjustable length paddles mostly comprises a blade for gliding through the waters; a hollow lower shaft that connects to the blade; an extendable upper shaft within the hollow lower shaft for adjusting the length of the paddle; a clamp that is fixed on the hollow lower shaft for clamping the extendable upper shaft; and a handle that connects to the extendable upper shaft. Wherein, the hollow lower shaft and the extendable upper shaft together form a paddle shaft that is adjustable in length allowing the user to hold and apply force.

In general, the hollow lower shaft and the extendable upper shaft, are both made of lightweight metals such as aluminium or aluminium alloys. Also, the clamp, as mentioned above, is used in other types of paddles, such as CN206125387U, CN209757491U, US20140248075A and US08162709.

SUMMARY OF THE INVENTION

The present invention provides a paddle, in which the paddle includes a blade and a paddle shaft. The paddle shaft includes a hollow lower shaft having one end connected to the blade, a rod that is inserted into the upper end of the hollow lower shaft and capable of moving freely within, and a upper shaft that is connected to one end of the rod and is inserted into said hollow lower shaft so that said upper shaft and said rod are capable of moving together within said hollow lower shaft. In this case, the rod and the hollow lower shaft are made of different materials.

In one aspect, the rod of the present invention has higher toughness than the hollow lower shaft.

In another aspect, the rod of the present invention is less likely to break instantaneously than the hollow lower shaft.

In still another aspect, the rod of the present invention is made of either polypropylene or glass-fibre reinforced polypropylene.

In yet another aspect of the present invention, the hollow lower shaft is made of metal, and the rod is made of plastic. Preferably, the plastic is either polypropylene or glass-fibre reinforced polypropylene. Preferably, the metal is either aluminium or aluminium alloys.

In still another aspect, the upper shaft of the present invention is made of metal. Preferably, the metal is either aluminium or aluminium alloys.

In yet another aspect of the present invention, the paddle includes a clamp that is fixed near the upper end of the hollow lower shaft to clamp the upper shaft when it is extended up from the lower shaft or to release the upper shaft when it is pulled out of the hollow lower shaft.

In still another aspect of the present invention, the paddle includes an accessory set and a pin-hole located near the upper end of the upper shaft. In this case, the accessory set includes a joint, a connection pipe, a c-shaped clip and a functional element. Furthermore, the joint has an axial-direction passage, an upper-hole and two side openings that radially passes through the joint respectively; wherein the axial-direction passage has a front opening and a rear opening, said front opening is capable of receiving the upper end of said upper shaft, the upper-hole and the two side openings are both located near the front opening, the two side openings are opposite to each other and respectively situated underneath the left and right side of the upper-hole. The connection pipe includes a front portion capable of receiving the upper end of the upper shaft to enter and a rear portion; the front portion is inserted into the rear opening of the joint and fixed in the axial-direction passage, the front portion also has a lower-hole that radially passes through and two arc surfaces respectively situated underneath the left and right side of the lower-hole, the lower-hole aligns to the upper-hole of the joint, the two arc surfaces each respectively exposed from the two side openings of the joint. The c-shaped clip is disposed on the joint and has a pin opposite to the upper-hole of the joint and two end portions that respectively reaches into the two side openings of the joint and leans against the two arc surfaces, wherein the c-shaped clip is capable of moving radially relative to the joint so that the pin that locates on the c-shaped clip can move radially together and be inserted or pulled out of the upper-hole of the joint and the lower-hole of the connection pipe, wherein when the upper end of the upper shaft is inserted into the joint then enters into the front portion of the connection pipe, the pin that is inserted into the upper-hole of the joint and the lower-hole of the connection pipe can also reach into the pin-hole of the upper shaft. The functional element is connected to the rear portion of the connection pipe. Preferably, the functional element is either another blade or a handle.

In yet another aspect of the present invention, the c-shaped clip has two bolts on each side of the two end portions; the joint has two restriction walls situated near each opening of the two side openings, the two restriction walls restrict the movements of the two bolts of the c-shaped clip. Preferably, each of the two restriction walls has a gap that allows the two bolts to pass correspondingly.

In still another aspect of the present invention, the paddle includes a first restriction part fixed within the connection pipe of the accessory set and a second restriction part fixed within the upper shaft, the first restriction part has a groove and the second restriction part has an insert sheet, when the upper shaft is inserted axially through the front opening of the joint and entered the front portion of the connection pipe, the insert sheet of the second restriction part is then embedded into the groove of the first restriction part. Preferably, the second restriction part has a receiving-hole, the receiving-hole is aligned to the pin-hole of the upper shaft, and the pin of the c-shaped clip also reaches further into the receiving-hole of the second restriction part.

Compared with related arts, the paddle provided by the present invention mainly sets on the rod and the hollow lower shaft to prevent or reduce the chances of the paddle suffering from an instantaneous break.

Other objectives, advantages and features of the present invention will be apparent from the following description referring to the attached drawings.

BRIEF DESCRIPTION OF THE DRAWINGS

The present invention will become more fully understood from the detailed description and the accompanying drawings, wherein:

FIG. 11 is a perspective view of another accessory set 6a of the present invention;

FIG. 12 is an (enlarged) partial cross-sectional view of the other accessory set 6 of the present invention.

DETAILED DESCRIPTION OF EMBODIMENTS

Figure 1:
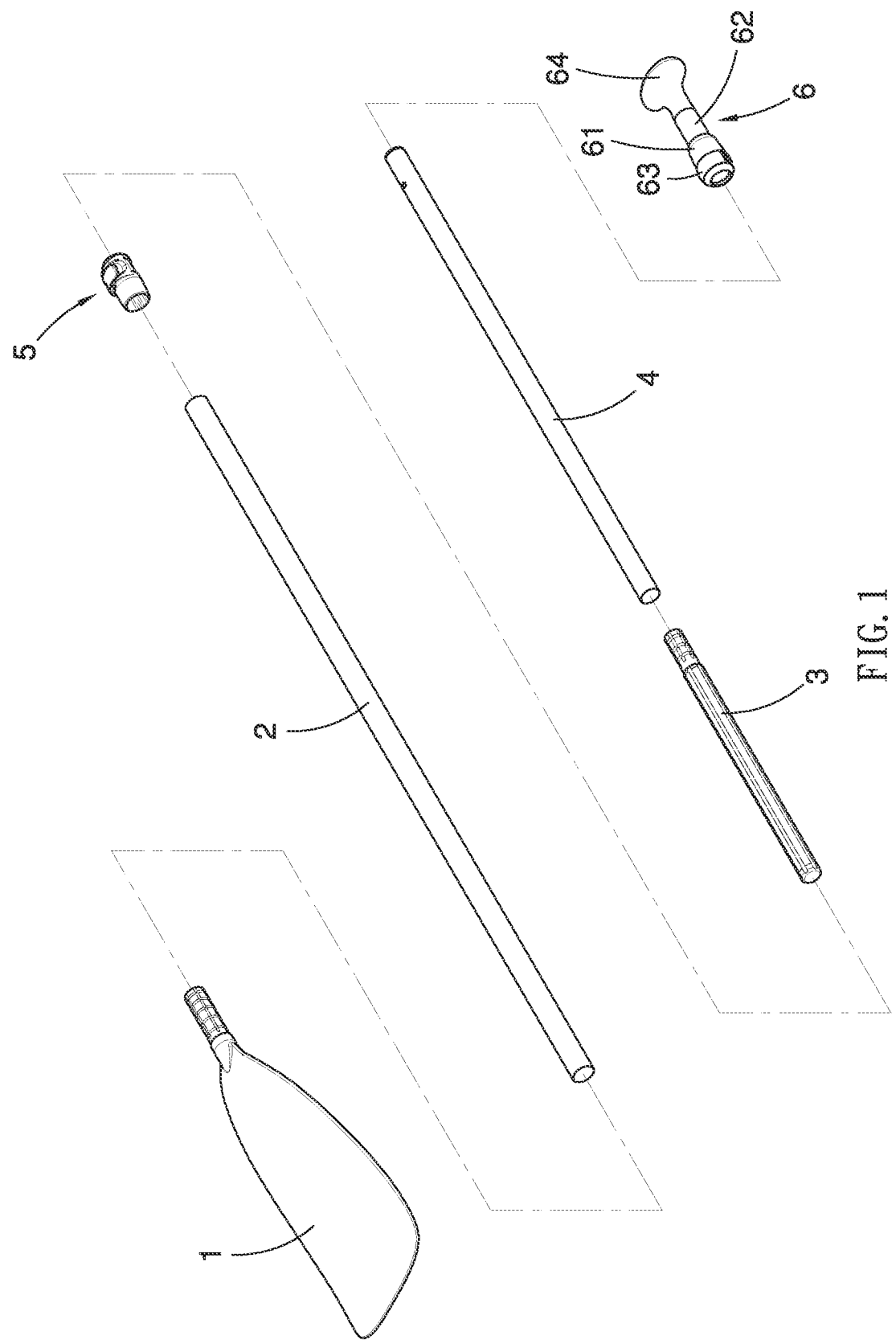
FIG. 1 is an exploded perspective view of a preferred embodiment of the paddle of the present invention.
Figure 2:
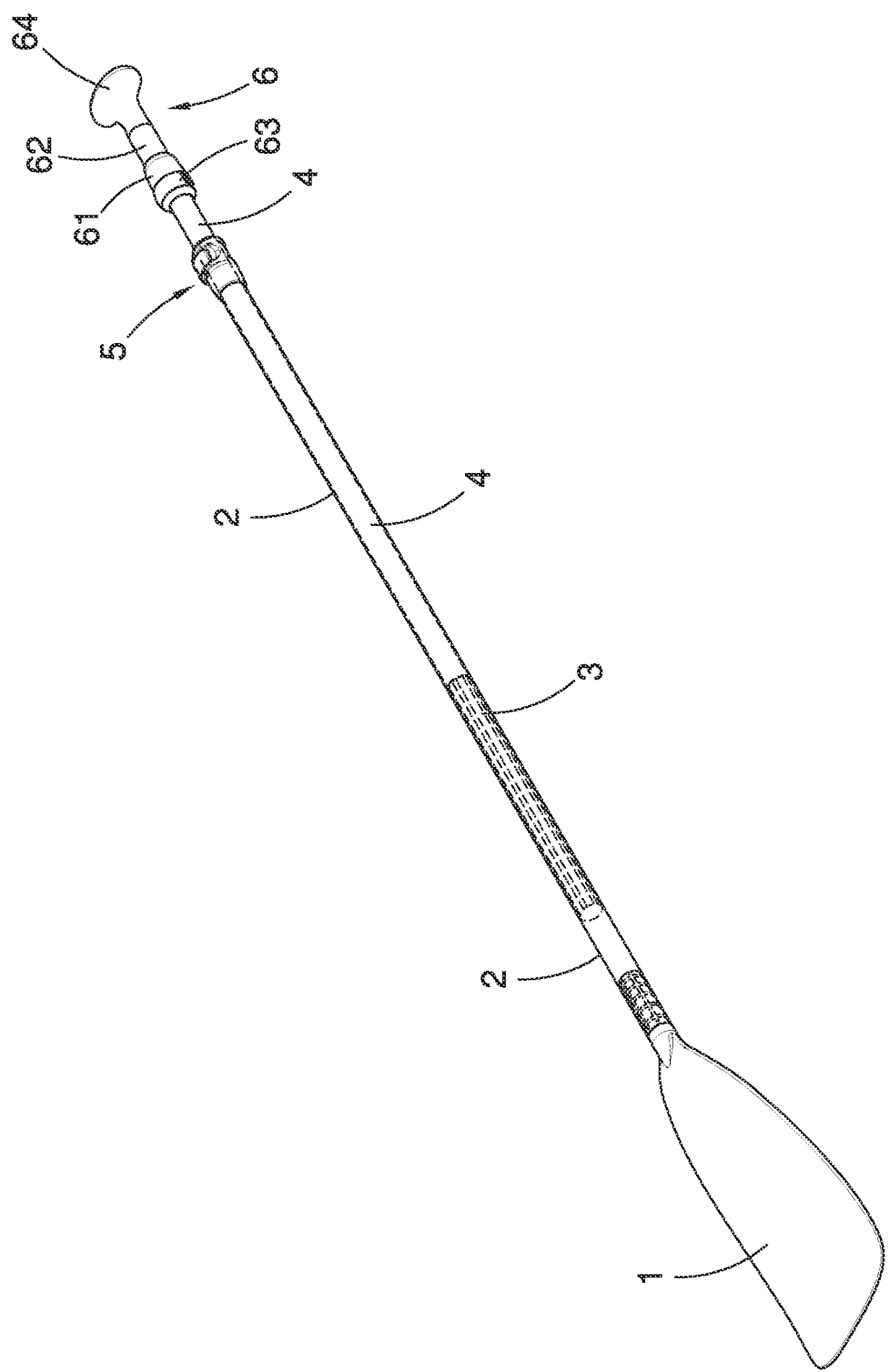
FIG. 2 is a perspective view of the preferred embodiment of the present invention.

Referring to FIGS. 1 and 2, there is shown a preferred embodiment of the present invention. The figures show a kind of paddle including a blade 1 for gliding through the waters, a hollow lower shaft 2 having one end connected to the blade 1, a rod 3 inserted into the upper end of the lower shaft 2 and capable of moving within the lower shaft 2 freely, and an upper shaft 4 having one end connected to the rod 3 and capable of moving together with the rod 3. The blade 1 is often made of plastic with more rigidity for gliding the waters efficiently, the plastic, in this case, is preferably nylon or glass-fibre reinforced nylon but not limited to the foregoing materials.

The hollow lower shaft 2, the rod 3, and the upper shaft 4 together form into an adjustable-length paddle shaft. When the length of the paddle needs to be adjusted, the desired length can be adjusted by pulling or pushing the upper shaft 4. The hollow lower shaft 2 and the upper shaft 4 are for a user to hold and apply force, they are often made of metal with good rigidity to allow the users to apply force better and transfer the force to the blade 1. Materials that are light and with good rigidity such as aluminium tubes or aluminium alloys tube (preferably the 6601 series aluminium alloys) are preferred but not limited to these foregoing materials.

Figure 3:
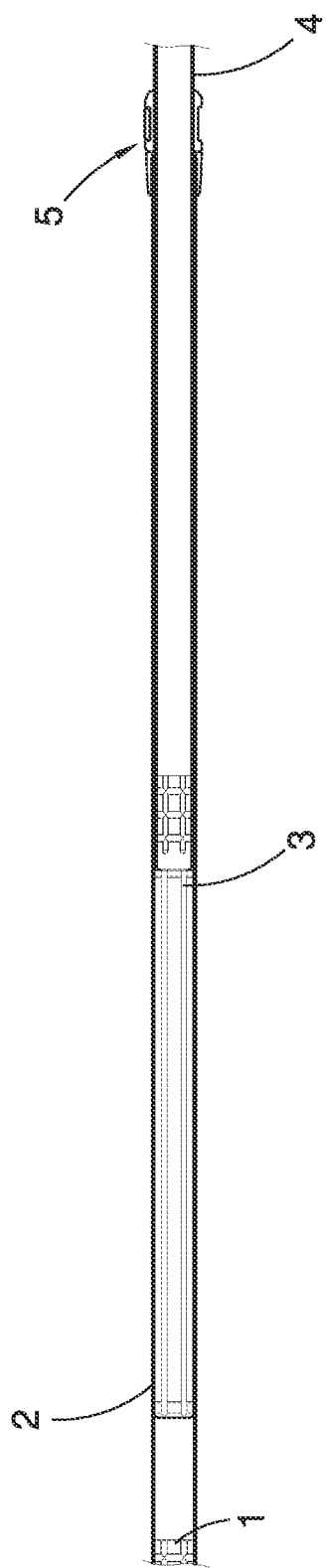
FIG. 3 is a partial cross-sectional view of FIG. 2.

As shown in FIG. 3, the rod 3 is located within the hollow lower shaft 2 in order to avoid or reduce the possibility of an instantaneous and complete break of the paddle. More specifically, an "instantaneous and complete break" refers to a paddle shaft that is broken into two separate pieces. If the paddle shaft is instantaneously and completely broken from a certain point on the hollow lower shaft 2 when being used by the user, the user might be subjected to harm from the fracture of the broken paddle shaft. For example, the user's thighs or abdomen might be impaled or lacerated by the broken paddle shaft. The rod 3 of the present invention is made of a material different from the hollow lower shaft 2 and is enclosed within the hollow lower shaft 2. The rod 3 is capable of moving together with the upper shaft 4, which can not only avoid or reduce the possibility of an instantaneous and complete break of the paddle, but also maintain the length adjustable function of the paddle.

The rod 3 can be made of plastic, preferably plastics with higher toughness such as polypropylene or glass-fibre reinforced polypropylene, and preferably blended with polypropylene blended with 30% glass-fibre for the desired toughness and rigidity. However, the material of the rod 3 is not limited to the foregoing materials. For example, it can be made of metal, plastic or other materials with higher toughness than the hollow lower shaft 2. In other words, the rod 3 can be made of the material less likely to be instantaneously and completely broken than the material of the hollow lower shaft 2.

The rod 3 and the upper shaft 4 are preferably made of different materials. For example, the rod 3 is made of plastic, and the upper shaft 4 is made of metal. However, the rod 3 and the upper shaft 4 can also be made of the same material. For example, one of the plastics mentioned above or other plastics can be selected to make the rod 3 and the upper shaft 4, if so, the rod 3 and the upper shaft 4 can be merged into one. The hollow lower shaft 2 and the upper shaft 4 are preferably made of the same material, such as one of the metals mentioned above but not limited to those. Also, the rod 3 and the upper shaft 4 are preferably hollow, but may also be solid.

Figure 4:
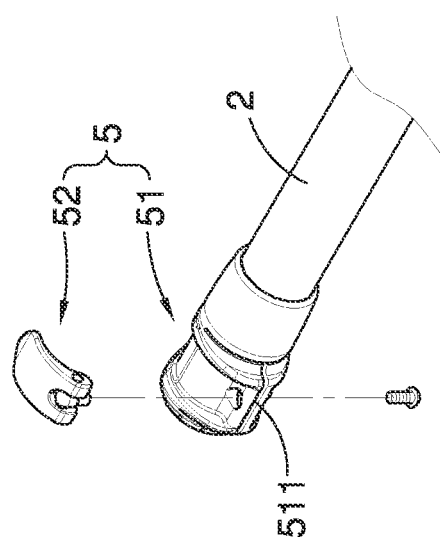
FIG. 4 is an exploded perspective view of a clamp 5 of the preferred embodiment of the present invention.
Figure 6:
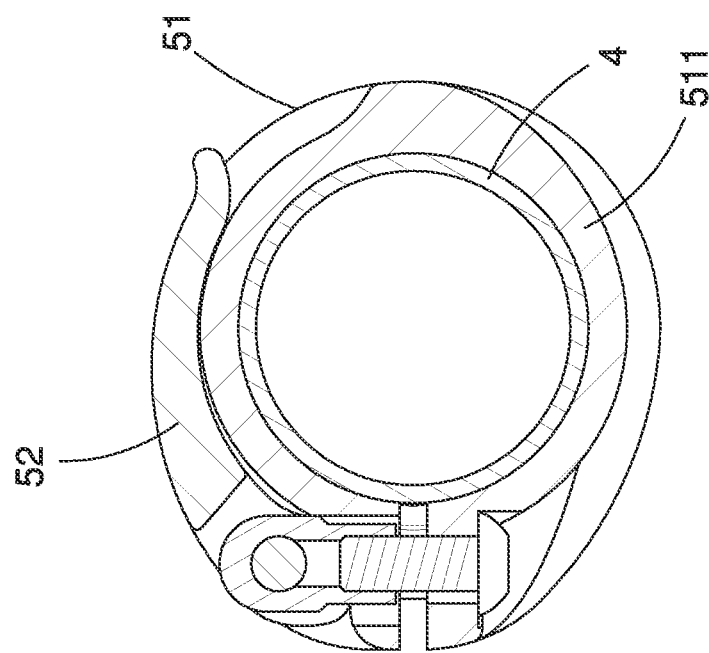
FIG. 5 and FIG. 6 are the (enlarged) cross-sectional views of the clamp 5 under different states when used.
Figure 5:
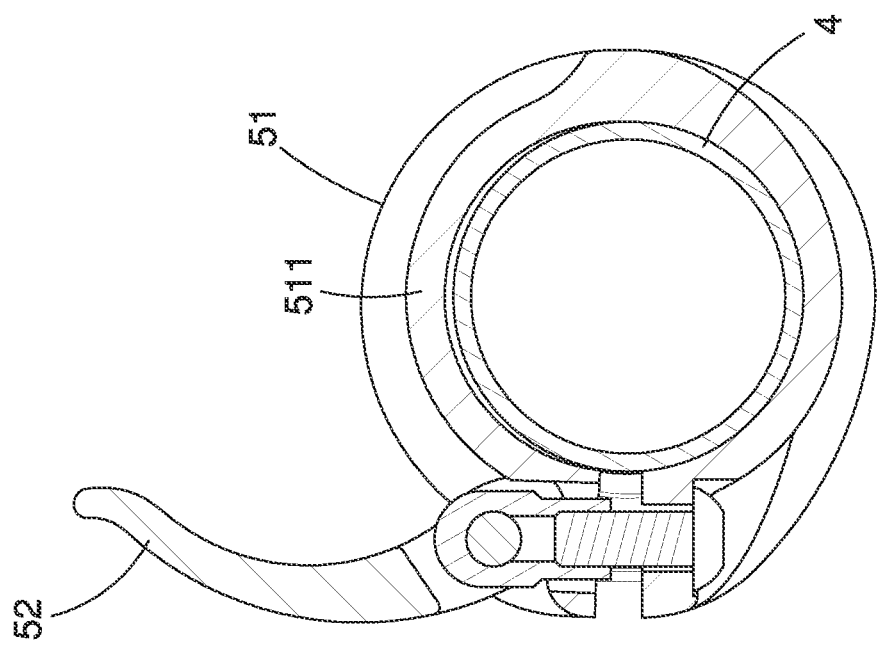

As shown in FIGS. 1 and 2, the paddle preferably further includes a clamp 5, the clamp 5 is fixed to the upper end of the hollow lower shaft 2 and is used to clamp the upper shaft 4 into a fixed position or release the portion of the upper shaft 4 when it is pulled out of the hollow lower shaft 2. In this embodiment, as shown in FIG. 4, the clamp 5 is a quick release clamp, which includes a base 51 and a tightening handle 52. FIG. 5 shows that the tightening handle 52 is in a released position, so that a c-shaped holder 511 of the base 51 does not clamp around the upper shaft 4, in this state, the upper shaft 4 can be pulled out or pushed in to adjust the length of the portion extending out of the hollow lower shaft 2. FIG. 6 shows that the tightening handle 52 is in a locked position, so that the c-shaped holder 511 of the base 51 tightly clamp around the upper shaft 4, which makes the upper shaft 4 not shift easily. In addition, the clamp 5 can also be replaced by any other locking mechanisms having the same or similar functions, such as the Taiwanese Patent No. 1490419, or other locking mechanisms used by other conventional adjustable rod.

Figure 7:
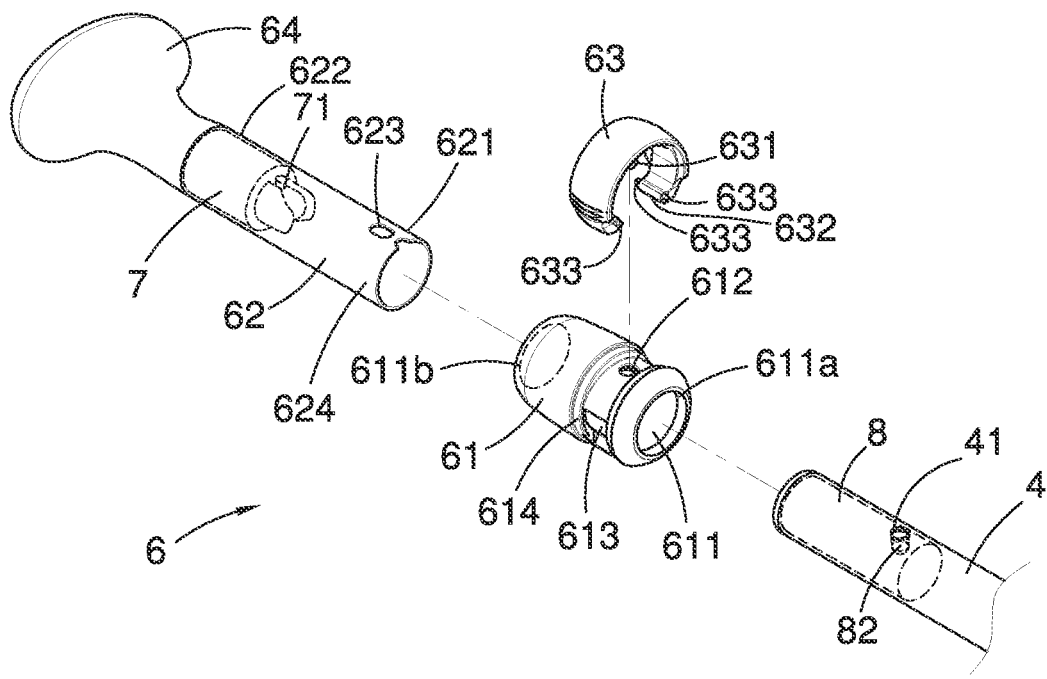
FIG. 7 and FIG. 8 are the exploded perspective views of an accessory set 6 of the preferred embodiment of the present invention from different angles.
Figure 8:
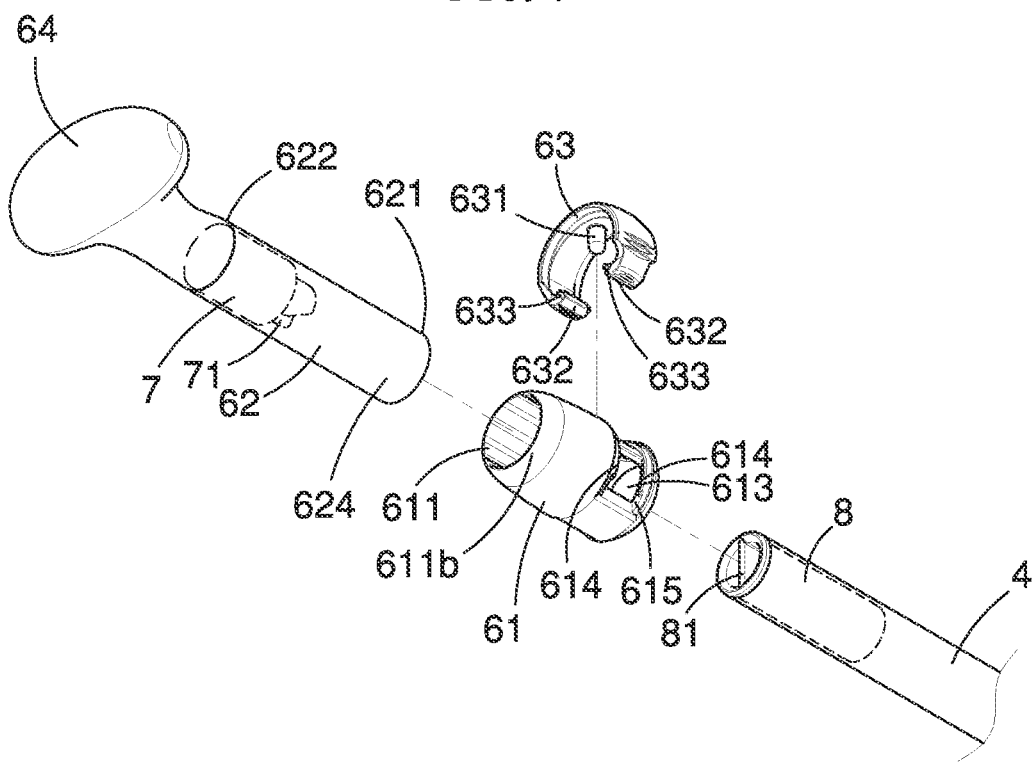
Figure 9:
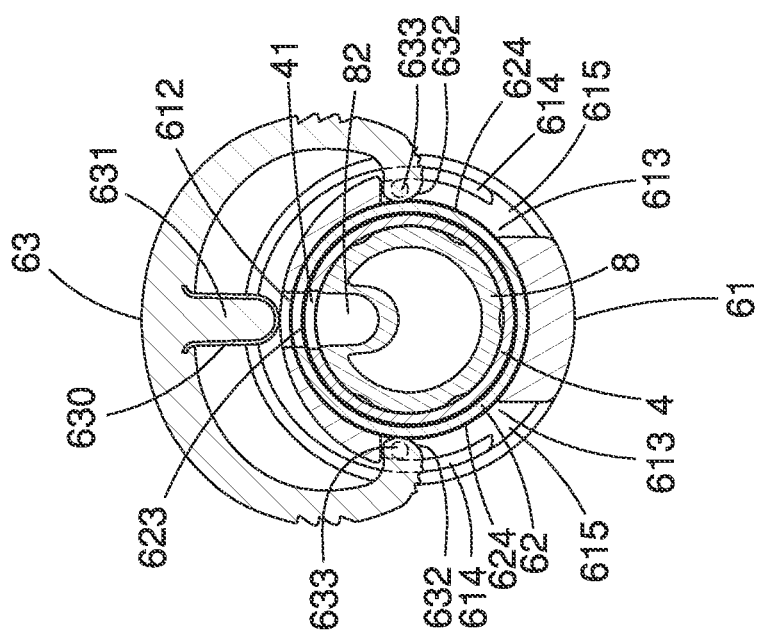

Moreover, as shown in FIGS. 1 and 2, the paddle preferably further includes an accessory set 6. In one embodiment, as shown in FIGS. 7 and 8, the accessory set 6 includes a joint 61 for receiving the upper end of the upper shaft 4, a connection pipe 62 connected to the joint 61 at one end, a c-shaped clip 63 fixed on the joint 61 and a functional element 64 connected to the other end of the connection pipe 62. Wherein:

The joint 61 is preferably made of plastic with good rigidity, such as nylon or glass-fibre reinforced nylon. In addition, the joint 61 has an axial-direction passage 611, an upper-hole 612 and two side openings 613 that radially passes through the joint respectively. The axial-direction passage 611 has a front opening 611a and a rear opening 611b, the upper-hole 612 and the two side openings 613 are both near the front opening 611a. As shown in FIG. 9, the two side openings 613 are opposite to each other and respectively situated underneath the left and right side of the upper-hole 612.

The connection pipe 62 has a front portion 621 and a rear portion 622. The front portion 621 is a short round tube inserted through the rear opening 611b of the joint 61 of the axial-direction passage 611 and fixed in the axial-direction passage 611. In this embodiment, not only the front portion 621, but also the entire connection pipe 62 is a round pipe with a predetermined length, and the material of the connection pipe 62 can be made of the aforementioned metals, but not limited to those, wherein the front portion 621 also has a lower-hole 623 radially passing through and two arc surfaces 624 respectively situated underneath the left and right side of the lower-hole 623. As shown in FIG. 9, the lower-hole 623 is aligned with the upper-hole 612 of the joint 61, the two arc surfaces 624 are respectively exposed from the two side openings 613 of the joint 61.

Figure 10:
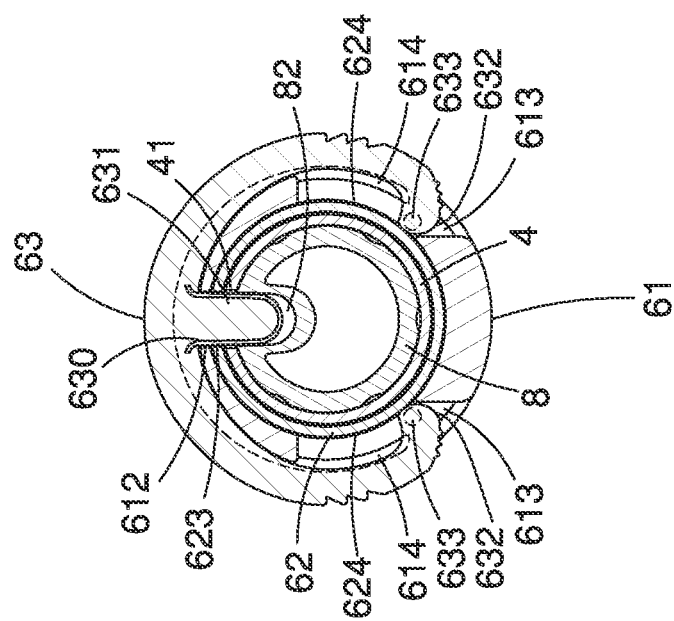
FIG. 9 and FIG. 10 are the (enlarged) cross-sectional views of the accessory set 6 under different states when used.

The c-shaped clip 63 is preferably made of the plastic with good elasticity, such as polyethylene terephthalate, or glass-fibre reinforced polyethylene terephthalate. The c-shaped clip 63 is disposed on the joint 61 and has a pin 631 and two end portions 632. As shown in FIG. 9, the pin 631 is opposite to the upper-hole 612 of the joint 61 and the two end portions 632 respectively reach into the two side openings 613 of the joint 61 and respectively leaning against the two arc surfaces 624 of the connection pipe 62. In this embodiment, the pin 631 is covered with a pin shell 630. The pin shell 630 is preferably made of a wear-resistant material, such as the aforementioned metals or other suitable metals. Furthermore, as shown in FIGS. 9 and 10, the c-shaped clip 63 capable of moving in the radial direction relative to the joint 61 so that the pin 631 can move radially with the movement of the c-shaped clip 63 to be inserted into or pulled out of the upper-hole 612 of the joint 61 and the lower-hole 623 of the connection pipe 62. The functional element 64 is connected to the rear portion 622 of the connection pipe 62, and as shown in the figure, it is a handle (or paddle grip), but not limited to this. For example, FIG. 11 shows another accessory set 6a, its functional element 64a is a blade, and the remaining components are the same as the accessory set 6 described above, and will not be discussed further in detail.

Since the c-shaped clip 63 is elastic, and its two end portions 632 are clipped onto the two arc surfaces 624 of connection pipe 62, therefore, as shown in FIGS. 9 and 10, when the c-shaped clip 63 is moving radially, it will have an elastic deformation in response to the change of radian of the two arc surfaces 624. Also, the two end portions 632 moves along the two arc surfaces 624 and always lean against the two arc surfaces 624. In this way, when the c-shaped clip 63 is radially pulled from a locked position, as shown in FIG. 10, to a released position, as shown in FIG. 9, the c-shaped clip 63 will be stuck temporarily and not return to the locked position arbitrarily, which keeps the pin 631 out of the upper-hole 612 and the lower-hole 623. At this point, the upper end of the upper shaft 4 can be inserted into the joint 61 and the connection pipe 62, and the pin-hole 41 on the upper shaft 4 will face the lower-hole 623 of the connection pipe 62. As long as the c-shaped clip 63 is pushed, the c-shaped clip 63 will return to its the locked position. At this point, the pin 631 is inserted into not only the upper-hole 612 of the joint 61 and the lower-hole 623 of the connection pipe 62, but also the pin-hole 41 of the upper shaft 4 so that the entire accessory set 6 cannot be separated from the upper shaft 4 unless the c-shaped clip 63 is pulled to the released position.

In this embodiment, as shown in FIGS. 7 and 8, each of the two sides of each end portion 632 of the c-shaped clip 63 has bolt 633, and each side opening 613 of the joint 61 has two opposite edges, the joint 61 has two restriction walls 614 respectively situated near the edges. As shown in FIG. 9, the two restriction walls 614 restrict respectively the movements of the bolts 633 of the c-shaped clip 63 so that the c-shaped clip 63 will not detach arbitrarily from the joint 61. Preferably, each restriction wall 614 also has a gap 615 allowing the corresponding bolts 633 to pass in order to facilitate the c-shaped clip 63 to be detached or reconnected to the joint 61. In any case, by means of the c-shaped clip 63, the accessory set 6 or 6a or even other accessory sets can be assembled with the upper shaft 4.

Preferably, as shown in FIGS. 7 and 8, the paddle further includes a first restriction part 7 fixed in the connection pipe 62 of the accessory set 6 and a second restriction part 8 fixed in the upper shaft 4. The first restriction part 7 has a groove 71, the second restriction part 8 has an insert sheet 81, and as shown in FIG. 12, when the upper shaft 4 is inserted axially into the front opening 611a of the joint 61 and enters into the front portion 621 of the connection pipe 62, the insert sheet 81 of the second restriction part 8 is embedded into the groove 71 of the first restriction part 7. The entire accessory set 6 will then be secured and not rotate along with the upper shaft 4.

In addition, the second restriction part 8 also has a receiving-hole 82 facing the pin-hole 41 of the upper shaft 4. As shown in FIG. 10, when the c-shaped clip 63 is in the locked position, the pin 631 further reaches into the receiving-hole 82 of the second restriction part 8.

What is claimed is:
1. A paddle, comprising:
a blade for gliding through the waters;
a hollow lower shaft having one end connected to said blade;
a rod inserted into the upper end of said hollow lower shaft and capable of moving within the hollow lower shaft, wherein, said rod and said hollow lower shaft are made of different materials; and
an upper shaft having a lower end connected to said rod and partly inserted into said hollow lower shaft so that said upper shaft and said rod are capable of moving together within said hollow lower shaft.
2. The paddle of claim 1, wherein said rod is inside said hollow lower shaft, and said upper shaft has a first section inserted said hollow lower shaft and a second section outside said hollow lower shaft.
3. The paddle of claim 1, wherein said rod has higher toughness than said hollow lower shaft so that said rod is less likely to be broken instantaneously than said hollow lower shaft.
4. The paddle of claim 1, wherein said rod is made of either polypropylene or glass-fibre reinforced polypropylene.
5. The paddle of claim 1, wherein said hollow lower shaft is made of metal and said rod is made of plastic.
6. The paddle of claim 5, wherein said plastic is either polypropylene or glass-fibre reinforced polypropylene.
7. The paddle of claim 6, wherein said upper shaft is made of metal.
8. The paddle of claim 7, said metal is either aluminium or aluminium alloy.

9. The paddle of claim 1, comprising a clamp fixed on the upper end of said hollow lower shaft to clamp the upper shaft into a fixed position or to release said upper shaft when it is pulled out of the hollow lower shaft.

10. The paddle of claim 1, further comprising an accessory set and, said upper shaft having a pin-hole near the upper end thereof, and said accessory set including:
   a joint having an axial-direction passage axially passing through, an upper-hole radially communicating to said axial-direction passage, and two side openings radially communicating to said axial-direction passage respectively, wherein said axial-direction passage has a front opening and a rear opening, said front opening is capable of receiving the upper end of said upper shaft, said upper-hole and said two side openings are both near said front opening, said two side openings are opposite to each other and respectively situated underneath the left and right side of said upper-hole;
   a connection pipe having a front portion capable of receiving the upper end of said upper shaft and a rear portion, said front portion inserted into said rear opening of said joint and fixed in said axial-direction passage, said front portion having a lower-hole radially passing through and two arc surfaces respectively situated underneath the left and right side of said lower-hole, said lower-hole aligning to said upper-hole of said joint, said two arc surfaces respectively exposed from said two side openings of said joint;
   a c-shaped clip disposed on said joint and having a pin aligned to said upper-hole of said joint and two end portions respectively reaching into said two side openings of said joint and respectively leaning against said two arc surfaces, wherein said c-shaped clip is capable of moving in the radial direction relative to said joint so that said pin can move radially with the movement of said c-shaped clip to insert into or pull out of said upper-hole of said joint and said lower-hole of said connection pipe, wherein when the upper end of said upper shaft is inserted into said joint then entering into said front pipe of said connection pipe, said pin inserted into said upper-hole of said joint and said lower-hole of said connection pipe can also be inserted into said pin-hole of said upper shaft; and
   a functional element connected to said rear portion of said connection pipe.

11. The paddle of claim 10, wherein said functional element is either another blade or a handle.

12. The paddle of claim 10, wherein each of the two sides of each end portion of said c-shaped clip has a bolt, each side opening of said joint has two opposite edges, said joint has two restriction walls respectively situated near said edges, and said restriction walls restrict respectively the movements of said bolts.

13. The paddle of claim 12, wherein each restriction wall has a gap to allow each corresponding bolt to pass.

14. The paddle of claim 10, including a first restriction part fixed within said connection pipe of said accessory set and a second restriction part fixed within said upper shaft, wherein said first restriction part has a groove and said second restriction part has an insert sheet, when said upper shaft is inserted axially into said front opening of said joint and entered into said front pipe of said connection pipe, said insert sheet of said second restriction part is embedded into said groove of said first restriction part.

15. The paddle of claim 14, wherein said second restriction part has a receiving-hole, said receiving-hole is facing said pin-hole of said upper shaft, and said pin of said c-shaped clip further reaching into said receiving-hole of said second restriction part.

16. The paddle of claim 1, wherein said upper shaft is longer than said rod.

17. The paddle of claim 1, wherein said upper shaft and said rod are made of different materials.

18. The paddle of claim 16, wherein said upper shaft and said rod are made of different materials.

19. The paddle of claim 1, wherein said upper shaft and said lower shaft are made of metal.

* * * * *